Aug. 3, 1948.  E. E. HESTON  2,446,328
PROTECTIVE APPARATUS FOR PREVENTING
THE ACCUMULATION OF ICE ON AIRFOILS
Filed May 1, 1945
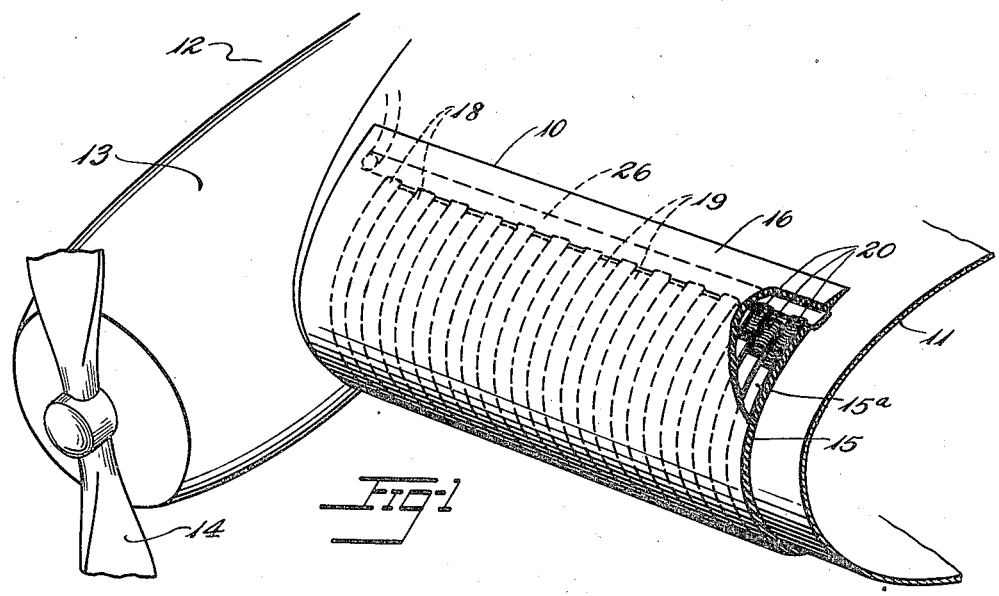
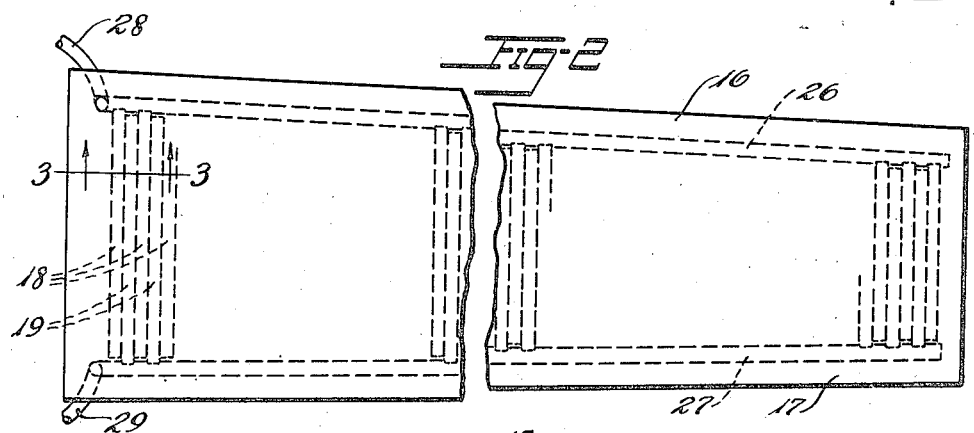
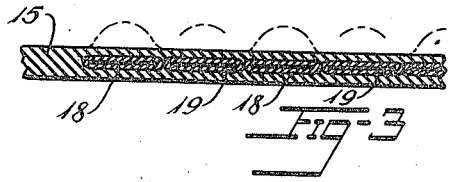
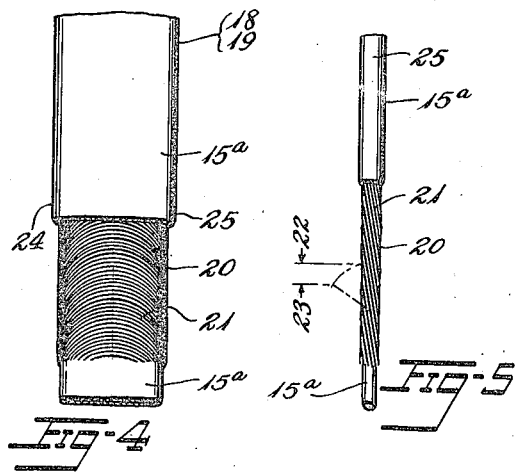
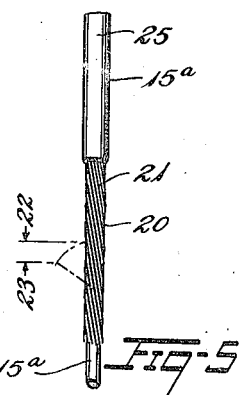
Inventor
Eugene E. Heston
By Hoxe S. Woodruff
Atty.

Patented Aug. 3, 1948

2,446,328

UNITED STATES PATENT OFFICE 2,446,328

PROTECTIVE APPARATUS FOR PREVENTING THE ACCUMULATION OF ICE ON AIRFOILS

Eugene E. Heston, Akron, Ohio, assignor to The B. F. Goodrich Company, New York, N. Y., a corporation of New York Application May 1, 1945, Serial No. 591,362

14 Claims. (Cl. 244—134)

This invention relates to protective apparatus for preventing the accumulation of ice on a surface and especially to such apparatus for airfoils and other parts of aircraft and other structures used in icing conditions.

Objects of the invention are to provide effectively for preventing the accumulation of ice on the exposed surfaces of structures, especially airfoils of aircraft; to provide for removing ice by an effective ice-shearing and breaking action; to provide for shifting a relatively small portion of a protective apparatus or covering in a direction toward one margin of the covering while stretching such portion transversely relative to said direction; to provide for maintaining the aerodynamic characteristics of such airfoils; and to provide simplicity of construction, light-weight and thinness of structure, convenience of manufacture and installation, and effectiveness of operation.

Other objects are to provide for distending at least a part of the covering into a plurality of adjacent ridges extending in one direction and in a manner to effect a serpentine-like twisting action of such part; to provide for shifting portions of alternate ridges in one direction of the covering while shifting portions of the other ridges in the opposite direction; to provide for such shifting action in closely adjacent parallel regions of the covering; and to provide for stretching the covering transversely of the shifting movement in such closely adjacent parallel regions of the covering during such shifting action.

These and other objects and advantages of the invention will be apparent from the following description.

In the accompanying drawings, which form a part of this specification and in which like numerals are employed to designate like parts throughout the same, Fig. 1 is a perspective front view from above of a protective apparatus or covering mounted upon the leading edge of a wing of an aircraft, and constructed in accordance with and embodying the invention, parts being broken away and in section, Fig. 2 is a plan view from above of the covering before being mounted on the wing, Fig. 3 is a sectional view on an enlarged scale taken along line 3—3 of Fig. 2, broken lines showing inflatable tubes in a distended condition, parts being broken away, Fig. 4 is a plan view on an enlarged scale of an inflatable tube in a flattened condition and showing a reinforcement in such tube having inclined helical convolutions, parts being broken away and in section, and Fig. 5 is a side view of the tube shown in Fig. 4, broken lines showing the path of swinging movement of one convolution relative to the axis of such tube.

In the illustrative form of the invention shown in the drawings, a protective covering 10 is mounted on the leading edge of a wing 11 of an aircraft 12 having an engine nacelle 13 and a propeller 14. Other airfoils, stabilizers, struts and other elements of the aircraft may be similarly provided with protective coverings, if desired.

The covering 10 includes a body 15 of resilient rubber or other rubber-like material having spanwise-extending attaching margins 16, 17 and may be of tapered form, as shown especially in Fig. 2, for accommodating variation in wing thickness. For the construction shown, the covering 10 also includes a plurality of inflatable passages or tubes 18, 19 extending chordwise, which tubes may be of relatively small diameter although not necessarily limited thereto, and arranged in spanwise series in closely adjacent parallel relation substantially throughout their extent. Such tubes are desirably embedded in the rubber body 15, as shown especially in Fig. 3.

The wall of each tube 18, 19 is of suitable rubber material 15a and has embedded therein a reinforcement comprising, preferably, a flexible fabric tube 20. Such fabric tube 20 includes unwoven cords 21 of cotton, linen, rayon, glass fibre, or other suitable fibre-like material, the cords 21 being arranged in substantially parallel helical convolutions with the planes of the convolutions inclined at an acute angle to the coincidental axes of the fabric tube and the inflatable tube in one direction along such axes and which cord convolutions are united with one another by such rubber material 15a.

The construction of each inflatable tube 18, 19, upon inflation thereof, facilitates a swinging movement of such convolutions relative to the axis of the inflatable tube in the other direction from that toward which the convolutions normally incline for a flattened condition of the tube. Each inflatable tube 18, 19 by virtue of its reinforced construction and the resiliency of the rubber material of its wall, upon inflation, distends the covering outwardly immediately over the tube, as shown especially in Figs. 3 and 5, into a ridge-like formation. Such distension of the tube 18, 19 shifts a portion of the wall of the tube substantially from a point 22 to a point 23 along the tube in the direction opposite that toward which the convolutions of the reinforcement are inclined and stretches also such portion laterally of the tube thereby effectively shearing and breaking the ice immediately over the tube. Such portion is intermediate margins 24, 25 of the inflatable tube 18, 19 and may be relatively small as compared to the remainder of such inflatable tube.

For effective ice-shearing and breaking action, the convolutions of respective alternate tubes 18, 18 are arranged at like angles in the same direction along the axes of such alternate tubes; while the convolutions of the respective other tubes 19, 19 are arranged at like angles in the opposite direction along such other tubes. This arrangement thus provides for shifting adjacent portions of adjacent tubes in opposite directions along such tubes in addition to providing the aforesaid transverse stretching action of such portions, all of which facilitates a pronounced serpentine-like twisting and ice-shearing action throughout the extent of the covering 10, which action is not found in prior protective coverings of conventional tube construction and which action is advantageous in promptly and thoroughly removing the ice deposited on the covering. The action may be examined by considering the behaviour of one of the cords or distention-controlling elements extending across a tube. The cord does not extend directly from its attachment at one margin to its attachment at the other margin but occupies a circuitous path in the deflated condition of the tube in a manner to compel the wall portion of the covering overlying the tube to shift in the direction along the margins of the tube under inflation of the tube and thereby exert a shearing action upon the ice deposited upon both said wall portion and an adjacent portion of the covering in addition to the outward distending action upon the ice overlying such wall portion under the inflation of the tube.

The inflatable tubes 18, 19 may be disposed to extend wholly in the chordwise direction, as shown in the drawings, or wholly in the spanwise direction, or may be disposed in part chordwise and in part spanwise in any suitable arrangement thereof for obtaining the desired surface configuration of the covering while maintaining the desired aerodynamic characteristics of the airfoil.

In the construction illustrated, each of the inflatable tubes 18, 18 comprising one series of tubes, is in communication at one end thereof with a tubular conduit 26 in the covering extending along the upper spanwise attaching margin 16; and each of the inflatable tubes 19, 19 comprising a second series of tubes, is in communication at one end thereof with a second tubular conduit 27 in the covering extending desirably along the lower spanwise attaching margin 17. Such tubular conduits 26, 27 have walls of suitable rubber material, fabric reinforced or unreinforced as desired, and are connected, for inflating purposes, by suitable flexible tubing 28, 29 to a source of air under pressure including cyclic control means disposed in the aircraft 12 at any desired location. This arrangement facilitates inflating the respective series of tubes cyclically in alternation or, if desred, both series of tubes may be inflated simultaneously.

The hereinabove described construction provides a covering having desirable thinness and light weight while presenting a relatively smooth surface for facilitating smooth airflow around the leading edge and rearwardly of the wing. The fabric and rubber parts of the covering 10 are preferably united as by vulcanization under heat and pressure.

Desirably, the attaching margins 16, 17, reinforced or unreinforced as desired, are tapered-in-section to thin edges for facilitating smooth airflow rearwardly of the covering. Such covering 10 may be attached to the wing 12 in a condition of a stretch between the margins 16, 17, in which case the margins per se are anchored to the wing structure as by a suitable adhesive such, for example, as an air-curing rubber cement, or by other suitable fastener means such, for example, as spaced-apart screw fasteners (not shown) extending through apertures in the margins and engaging such wing structure, or by both. Suitable venting construction may be provided for venting air from the space between the covering and the wing intermediate the attaching margins. Good ice-removal results may also be obtained by marginally attaching the covering with little or no stretching between such margins 16, 17 and selectively adhering and anchoring the covering at successive relatively narrow chordwise zones extending along the axes of the respective inflatable tubes, although, if desired, the entire under surface of the covering may be adhered to such wing. Such adhesive attachment, wholly or partially of the extent of the covering, avoids objectionable entrapment of air beneath the covering during its operation whereby venting constructions may be dispensed with, if desired.

In the operation of the protective apparatus or covering 10 for cyclical inflation in alternation of each series of inflatable tubes 18, 19, the covering is distended into a series of spaced-apart parallel ridges immediately over each such inflatable tube and at the same time portions of such ridges are shifted axially along the tubes and stretched transversely thereof. Upon inflation, each tube, for example, is distended from its flattened condition, as shown especially in Figs. 1 and 3, to an outwardly bulged condition relative to the airfoil and the convolutions of the reinforcing tube 20 swing relative to the axis of the inflatable tube in a direction opposite that toward which they are inclined when in the flattened condition. Each convolution tends to pivot about the opposite margins 24, 25 of each tube 18, 19 substantially at the plane of the neutral axis of such tube. Each inflatable tube 18, 19, especially at the reinforced outer wall portion thereof, being united with the rubber body 15 of the covering 10 also distends outwardly the outer surfaces of such covering into a rounded ridge-like formation, as shown especially in Fig. 3, while shifting a portion of the covering longitudinally of the tube, as shown especially in Fig. 5, and stretching such portion transversely of the tube. Since the reinforcing fabric tube 20 is coextensive with the length of the inflatable tube 18, 19, such portion may be coextensive with the length of such inflatable tube but of lesser transverse extent than that of the inflatable tube per se.

Such action of each inflatable tube of each of the two series thereof provides shifting movement of portions of the covering at spanwise spaced-apart chordwise-extending zones thus making possible the desired serpentine-like twisting and ice-shearing action of the covering for effectively removing the ice deposited thereon. Upon inflation of one of the series of inflatable tubes, for example the tubes 18, 18, such shifting movement of portions of the covering occurs axially of such tubes at such spaced-apart zones in the direction toward the upper attaching margin 16, while upon inflation of the inflatable tubes 19, 19 of the second series thereof such shifting movement occurs at such zones in the direction toward the lower attaching margin 17. By virtue of such alternate inflation of the respective series of inflatable tubes resulting in the distention of such covering into chordwise-extending ridges effecting the desired shifting and stretching action at spaced-apart zones in the covering, such functioning of the covering effectively shears and breaks the ice upon the covering for removal by the scavenging action of the ambient flow of air across the wing.

Variations may be made without departing from the scope of the invention as it is defined in the following claims.

I claim:

1. Apparatus for preventing the accumulation of ice on a surface, said apparatus comprising a covering of resilient rubber-like material for said surface having an inflatable passage therein, means for inflating said passage to distend the wall portion of the covering overlying said passage outwardly relative to an adjacent portion of the covering, and a distension-controlling element disposed across said wall portion from margin to margin of said passage and secured to said wall portion at said margins and intermediate the same, the disposition of said element in the deflated condition of said passage being circuitous between its attachments at said margins in a manner to compel said wall portion to shift in the direction along said margins under inflation of said passage and thereby exert a shearing action upon ice deposited upon both said wall portion and adjacent portion of the covering in addition to the outward distending action upon the ice overlying said wall portion under the inflation.

2. Apparatus for preventing the accumulation of ice on a surface, said apparatus comprising a covering of resilient rubber-like material for said surface having an inflatable passage therein, means for inflating said passage to distend the wall portion of the covering overlying said passage outwardly relative to an adjacent portion of the covering, and a plurality of distension-controlling elements disposed across said wall portion from margin to margin of said passage and secured to said wall portion at said margins and intermediate the same, the disposition of each element in the deflated condition of said passage being circuitous between its attachments at said margins in a manner to compel said wall portion to shift in the direction along said margins under inflation of said passage and thereby exert a shearing action upon ice deposited upon both said wall portion and adjacent portion of the covering in addition to the outward distending action upon the ice overlying said wall portion under the inflation.

3. Apparatus for preventing the accumulation of ice on a surface, said apparatus comprising a covering of resilient rubber-like material for said surface having inflatable tubular passages therein in side-by-side relation to one another, means for inflating said passages to distend the wall portions of the covering overlying said passages outwardly relative to adjacent portions of the covering, and a distension-controlling element at each of said passages disposed across the overlying wall portion from margin to margin of the passage and secured to said overlying wall portion at said margins and intermediate the same, the disposition of each distension-controlling element in the deflated condition of the passage being circuitous between its attachments at said margins in a manner to compel said overlying wall portion to shift in the direction along said margins under inflation of said passage and thereby exert a shearing action upon ice deposited upon both said overlying wall portion and an adjacent portion of the covering in addition to the outward distending action upon the ice overlying said wall portion under the inflation, the circuitous disposition of said distension-controlling element of each tubular passage being predominantly in one direction of the passage and in a direction opposite that of said element of the other passage for effecting shifting of the overlying wall portions of said passages in opposite directions and additive extent.

4. Apparatus for preventing the accumulation of ice on a surface, said apparatus comprising a covering of resilient rubber-like material for said surface having inflatable tubular passages therein in side-by-side relation to one another, means for inflating said passages to distend the wall portions of the covering overlying said passages outwardly relative to adjacent portions of the covering, and a plurality of distension-controlling elements along each of said passages, each of said elements at a passage being disposed across the overlying wall portion from margin to margin of said passage and secured to said overlying wall portion at said margins and intermediate the same, the disposition of each of said elements in the deflated condition of the passage being circuitous between its attachments at said margins in a manner to compel said overlying wall portion to shift in the direction along said margins under inflation of said passage and thereby exert a shearing action upon ice deposited upon both said overlying wall portion and an adjacent portion of the covering in addition to the outward distending action upon the ice overlying said wall portion under the inflation, the circuitous disposition of said distension-controlling elements of each tubular passage being predominantly in one direction of the passage and in a direction opposite that of said elements of the other passage for effecting the shifting of the overlying wall portions of said passages in opposite directions and additive extent.

5. Apparatus for preventing the accumulation of ice on a surface, said apparatus comprising a covering of resilient rubber-like material for said surface having an inflatable tubular passage therein, means for inflating said passage to distend the wall portion of the covering overlying said passage outwardly relative to an adjacent portion of the covering, and a distension-controlling cord element embedded in the wall of said passage and disposed across said wall portion from margin to margin of said passage and secured to said wall portion at said margins and intermediate the same, said cord element in the deflated condition of said passage being bowed between its attachments at said margins to compel said wall portion to shift in the direction along said margins by virtue of the tendency of said cord element to swing from its bowed condition under inflation of said passage and thereby exert a shearing action upon ice deposited upon both said wall portion and adjacent portion of the covering in addition to the outward distending action upon the ice overlying said wall portion under the inflation.

6. Apparatus for preventing the accumulation of ice on a surface, said apparatus comprising a covering of resilient rubber-like material for said surface having inflatable tubular passages therein in side-by-side relation to one another, means for inflating said passages to distend the wall portions of the covering overlying said passages outwardly relative to adjacent portions of the covering, and a distension-controlling cord element embedded in the wall of each of said passages and disposed across the overlying wall portion from margin to margin of the passage and secured to said overlying wall portion at said margins and intermediate the same, said cord element in the deflated condition of the passage being bowed between its attachments at said margins to compel said overlying wall portion to shift in the direction along said margins by virtue of the tendency of said cord element to swing from its bowed condition under inflation of said passage and thereby exert a shearing action upon ice deposited upon both said overlying wall portion and an adjacent portion of the covering in addition to the outward distending action upon the ice overlying said wall portion under the inflation, the bowed disposition of said cord element of each tubular passage being predominantly in one direction of the passage and in a direction opposite that of said cord element of the other tubular passage for effecting shifting of the overlying wall portions of said passages in opposite directions and additive extent.

7. Apparatus for preventing the accumulation of ice on a surface, said apparatus comprising a covering of resilient rubber-like material for said surface having inflatable tubular passages therein in side-by-side relation, means for inflating said passages to distend the wall portions of the covering overlying said passages outwardly relative to adjacent portions of the covering, and a plurality of distension-controlling cord elements along each of said passages and embedded in the walls of said passages in close adjacency to one another, each of said cord elements being disposed across the overlying wall portion from margin to margin of the tubular passage and secured to the rubber-like material of said overlying wall portion at said margins and continuously between the same, each of said cord elements in the deflated condition of the passage being bowed between its attachments at said margins to compel said overlying wall portion to shift in the direction along said margins by virtue of the tendency of the cord element to swing from its bowed condition under inflation of said passage and thereby exert a shearing action upon ice deposited upon both said overlying wall portion and an adjacent portion of the covering in addition to the outward distending action upon the ice overlying said wall portion under the inflation, the bowed disposition of said distension-controlling cord elements of each tubular passage being predominantly in one direction of the tubular passage and in a direction opposite that of said cord elements of the other tubular passage for effecting shifting of the overlying wall portions of said tubular passages in opposite directions and additive extent.

8. Apparatus for preventing the accumulation of ice on a surface, said apparatus comprising a covering of resilient rubber-like material for said surface having an inflatable tubular passage therein, means for inflating said passage to distend the wall portion of the covering overlying said passage outwardly relative to an adjacent portion of the covering, and a distension-controlling flexible element disposed in a plurality of convolutions extending around said passage and along the same, each convolution being disposed across said wall portion from margin to margin of said passage and secured to the rubber-like material of said wall portion at said margins and continuously between the same, the disposition of each of said convolutions in the deflated condition of said passage being circuitous between its attachments at said margins in a manner to compel said wall portion to shift in the direction along said margins under inflation of said passage and thereby exert a shearing action upon ice deposited upon both said wall portion and adjacent portion of the covering in addition to the outward distending action upon the ice overlying said wall portion under the inflation.

9. Apparatus is defined in claim 8 in which said convolutions of said elements are in helical form with adjacent convolutions thereof disposed in close adjacency.

10. Apparatus for preventing the accumulation of ice on a surface, said apparatus comprising a covering of resilient rubber-like material for said surface having a plurality of inflatable tubular passages therein in close adjacency and side-by-side relation to one another, means for inflating said passages to distend the wall portions of the covering overlying said passages outwardly relative to adjacent portions of the covering, and a distension-controlling flexible element at each of said passages disposed in a plurality of convolutions extending around the tubular passage and along the same, each convolution being disposed across the overlying wall portion from margin to margin of said tubular passage and secured to the rubber-like material of said overlying wall portion at said margins and continuously between the same, the disposition of each of said convolutions in the deflated condition of said tubular passage being circuitous between its attachments at said margins in a manner to compel said overlying wall portion to shift in the direction along said margins under inflation of said tubular passage and thereby exert a shearing action upon ice deposited upon both said overlying wall portion and adjacent portion of the covering in addition to the outward distending action upon the ice overlying said wall portion under the inflation, the circuitous disposition of said convolutions of each tubular passage being predominantly in one direction of the tubular passage and in a direction opposite that of said convolutions of the other tubular passage for effecting shifting of the overlying wall portions of said tubular passages in opposite directions and additive extent.

11. Apparatus as defined in claim 10 in which said distension-controlling flexible element is of cord material and in which said convolutions of said flexible element are in helical form with adjacent convolutions thereof disposed in close adjacency to one another, each of said convolutions in the deflated condition of the tubular passage being bowed between its attachments at said margins in one direction of the passage for compelling said shifting of the overlying wall portion of the covering by virtue of the tendency of the convolution to swing from its bowed condition under inflation of the tubular passage.

12. Apparatus for preventing the accumulation of ice on a surface, said apparatus comprising a covering of resilient rubber-like material for said surface having a plurality of inflatable tubular passages therein in close adjacency and side-by-side relation to one another, alternate passages providing a set of said passages and the intervening passages providing a second set, means for independently inflating each set of passages to distend the wall portions of the covering overlying the passages of the set outwardly relative to adjacent portions of the covering, and distension-controlling flexible elements disposed in a plurality of convolutions in helical form extending around each of said passages and along the same with adjacent convolutions thereof disposed in close adjacency to one another, each of said convolutions being disposed across the overlying wall portion from margin to margin of the tubular passage and secured to the rubber-like material of said overlying wall portion at said margins and continuously between the same, each of said convolutions in the deflated condition of said tubular passage being bowed between its attachments at said margins to compel said overlying wall portion to shift in the direction along said margins by virtue of the tendency of the convolution to swing from its bowed condition under inflation of said tubular passage and thereby exert a shearing action upon ice deposited upon both said overlying wall portion and an adjacent portion of the covering in addition to the outward distending action upon the ice overlying said wall portion under the inflation, the bowed disposition of said convolutions of the first said set of passages being predominantly in one direction of the passages and in a direction opposite that of said convolutions of said second set of passages for effecting shifting of the overlying wall portions of said sets of passages in opposite directions and additive extent.

13. Apparatus for preventing the accumulation of ice on the leading edge of an airfoil, said apparatus comprising a covering of resilient rubber-like material for said leading edge having inflatable tubular passages extending chordwise therein in side-by-side relation to one another, means for inflating said passages to distend the wall portions of the covering overlying said passages outwardly relative to adjacent portions of the covering, and a plurality of distension-controlling elements along each of said passages in close adjacency to one another, each of said elements being disposed across the overlying wall portion from margin to margin of the passage and secured to the overlying wall portion at the margins of said passage and intermediate the same, the disposition of each said elements in the deflated condition of said passage being circuitous between its attachments at said margins in a manner to compel said overlying wall portion to shift in the chordwise direction along said margins under inflation of said passage and thereby exert a shearing action upon ice deposited upon both said overlying wall portion and an adjacent portion of the covering in addition to the outward distending action upon the ice overlying said wall portion under the inflation, the circuitous disposition of said distension-controlling elements of each tubular passage being predominantly in one direction of the passage and in a direction opposite that of said elements of the other passage for effecting shifting of the overlying wall portions of said passages in opposite directions and additive extent.

14. Apparatus for preventing the accumulation of ice on the leading edge of an airfoil, said apparatus comprising a covering of resilient rubber-like material for said leading edge having a plurality of inflatable tubular passages therein in close adjacency and side-by-side relation to one another and extending chordwise of the covering, alternate passages providing a set of said passages and the intervening passages providing a second set, means extending along a spanwise margin of the covering in communication with the first said set of passages for inflating the same, means extending along the other spanwise margin of the covering in communication with said second set of passages for inflating the same, the inflation of each set of passages distending wall portions of the covering overlying the passages of the set outwardly relative to adjacent portions of the covering, and a plurality of distension-controlling cord elements disposed in a plurality of convolutions in helical form extending around said passages and along the same with adjacent convolutions thereof disposed in close adjacency to one another, each of said convolutions being disposed across the overlying wall portion from margin to margin of the tubular passage and secured to the rubber-like material of said overlying wall portion at said margins of said tubular passage and continuously between the same, each of said convolutions in the deflated condition of said tubular passage being bowed between its attachments of said margins to compel said overlying wall portion to shift in the direction along said margins by virtue of the tendency of the convolutions to swing from its bowed condition under inflation of said passage and thereby exert a shearing action upon ice deposited upon both said overlying wall portion and an adjacent portion of the covering in addition to the outward distending action upon the ice overlying said wall portion under the inflation, the bowed disposition of said convolutions of the first said set of passages being predominantly in one direction of the passages and in a direction opposite that of said convolutions of said second set of passages for effecting shifting of the overlying wall portions of said sets of passages in opposite chordwise directions and additive extent.

EUGENE E. HESTON.

REFERENCES CITED

The following references are of record in the file of this patent:

UNITED STATES PATENTS

| Number | Name | Date |
| --- | --- | --- |
| 1,585,339 | Fitzgerald | May 18, 1926 |
| 1,709,797 | Kuhlke | Apr. 16, 1929 |
| 1,740,445 | Fetter | Dec. 24, 1929 |
| 2,025,919 | Waner | Dec. 31, 1935 |
| 2,168,008 | Taylor | Aug. 1, 1939 |
| 2,169,041 | Gammeter | Aug. 8, 1939 |
| 2,173,262 | Monegan et al. | Sept. 19, 1939 |
| 2,204,122 | Colley | June 11, 1940 |
| 2,253,746 | Zimmerman | Aug. 26, 1941 |

FOREIGN PATENTS

| Number | Country | Date |
| --- | --- | --- |
| 29,030 | Great Britain (1909) | Dec. 1, 1910 |
| 143,644 | Great Britain | June 1, 1920 |

Certificate of Correction

Patent No. 2,446,328.                                August 3, 1948.

EUGENE E. HESTON

It is hereby certified that errors appear in the printed specification of the above numbered patent requiring correction as follows:

Column 3, line 69, for "desred" read *desired*; column 4, line 9, strike out "a" before "stretch"; line 56, for the word "surfaces" read *surface*; column 8, line 21, claim 9, for "is" before "defined" read *as*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*